Figure 1:
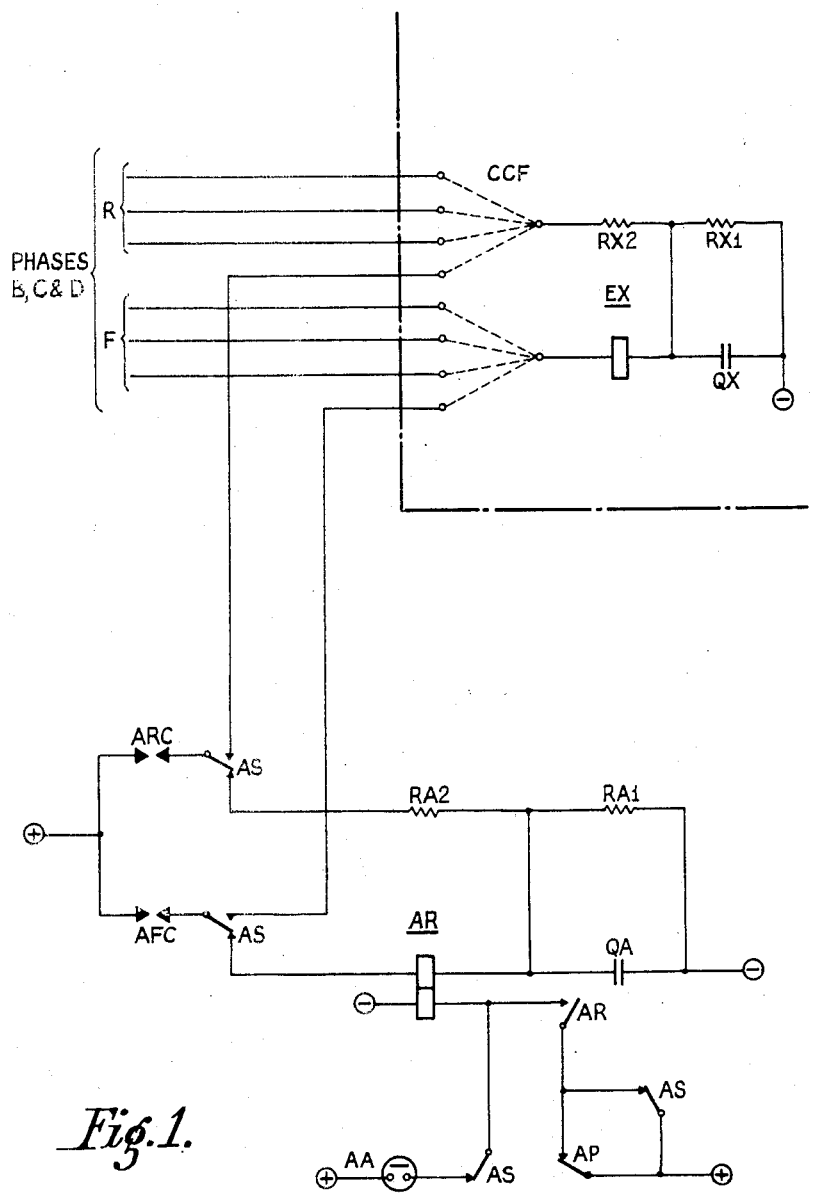

Fig.5.
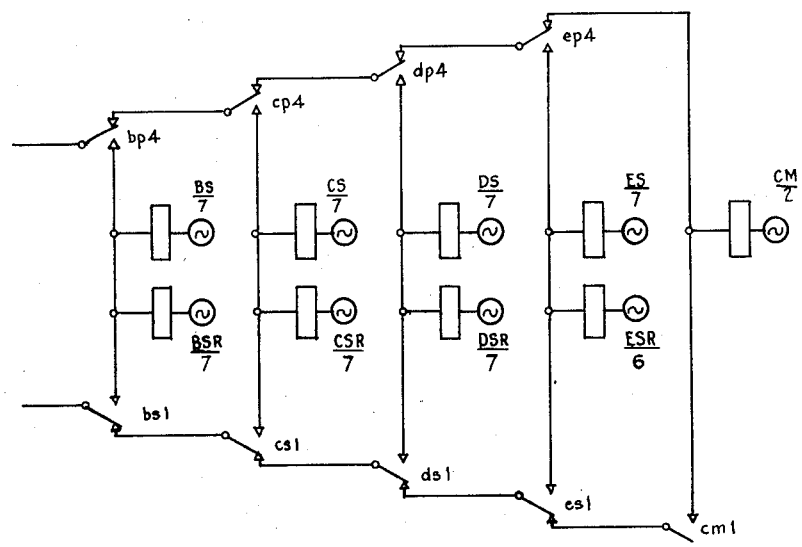
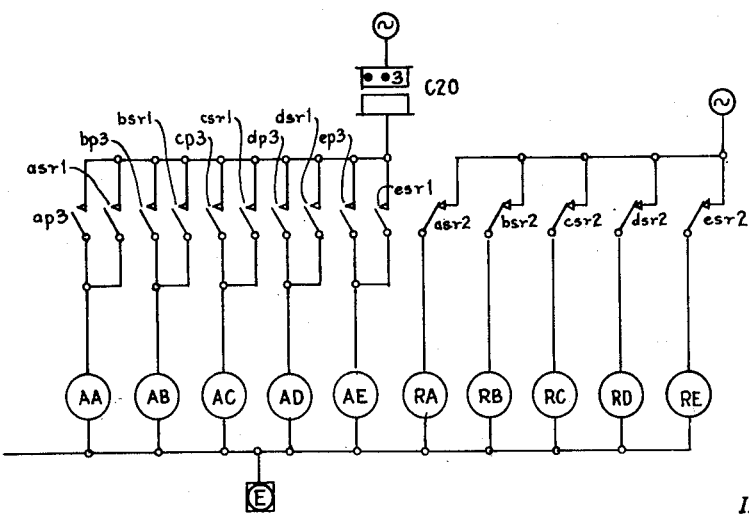

Patented July 15, 1952

2,603,703

UNITED STATES PATENT OFFICE 2,603,703

VEHICLE DETECTING ARRANGEMENT SUITABLE FOR USE IN TRAFFIC CONTROL SYSTEMS

Alan Leslie Range and Ernest Thorpe, Liverpool, England, assignors to Automatic Telephone & Electric Company Limited, Liverpool, England, a British company Application June 19, 1950, Serial No. 168,876
In Great Britain August 18, 1949

5 Claims. (Cl. 177—337)

The present invention relates to vehicle detecting arrangements suitable for use in traffic control systems and its chief object is to provide an arrangement whereby the operation of such systems may be improved and the control equipment simplified.

The construction of satisfactory vehicle detectors represents a serious problem for the designer if it is stipulated that such detectors are to be sufficiently sensitive to respond to a light traffic unit such as a bicycle and also to be sufficiently robust to withstand the impact of a very heavy vehicle possibly travelling at speed or braking fiercely. Hitherto this problem has not been solved completely satisfactorily and it has sometimes happened that detectors have developed faults which result in the permanent closure of the electrical signalling circuit. Such faults cannot always be dealt with immediately and in the meantime the operation of the system is prejudiced since the effect of such a faulty detector is to procure right of way for a maximum period for the traffic lane concerned even in the absence of traffic thereon, and this will delay traffic on other approaches and thus tend to nullify the advantages which a traffic-actuated signalling system is intended to secure. It is one of the features of the present invention that, though the normal operation of the detector unit will have the operating characteristics usually considered desirable, if a fault of the type referred to above should develop, the operation will not be seriously disturbed during the time which elapses before the fault can be put right.

According to one feature of the invention the relay which responds to the passage of a vehicle is connected in circuit with a capacitor in such manner that only a single relay operation lasting for a definite time period takes place however long the contacts operated from the detector remain closed. This operation may be modified if necessary by the provision of a locking circuit. The detector circuit is moreover connected to different relays according as the traffic phase concerned is or is not in possession of right of way and the relay connected up while the phase in question is in possession of right of way may be common to all the various phases and connection is made thereto over a cross-connecting frame so that extension may readily be provided for some phases and not others, for instance pedestrian phases.

A further advantage of the arrangement according to the present invention is that a unidirectional characteristic can be provided with a minimum of equipment and moreover as a general rule there is no current flow at the moment when the contacts separate so that sparking troubles are avoided.

Figure 2:
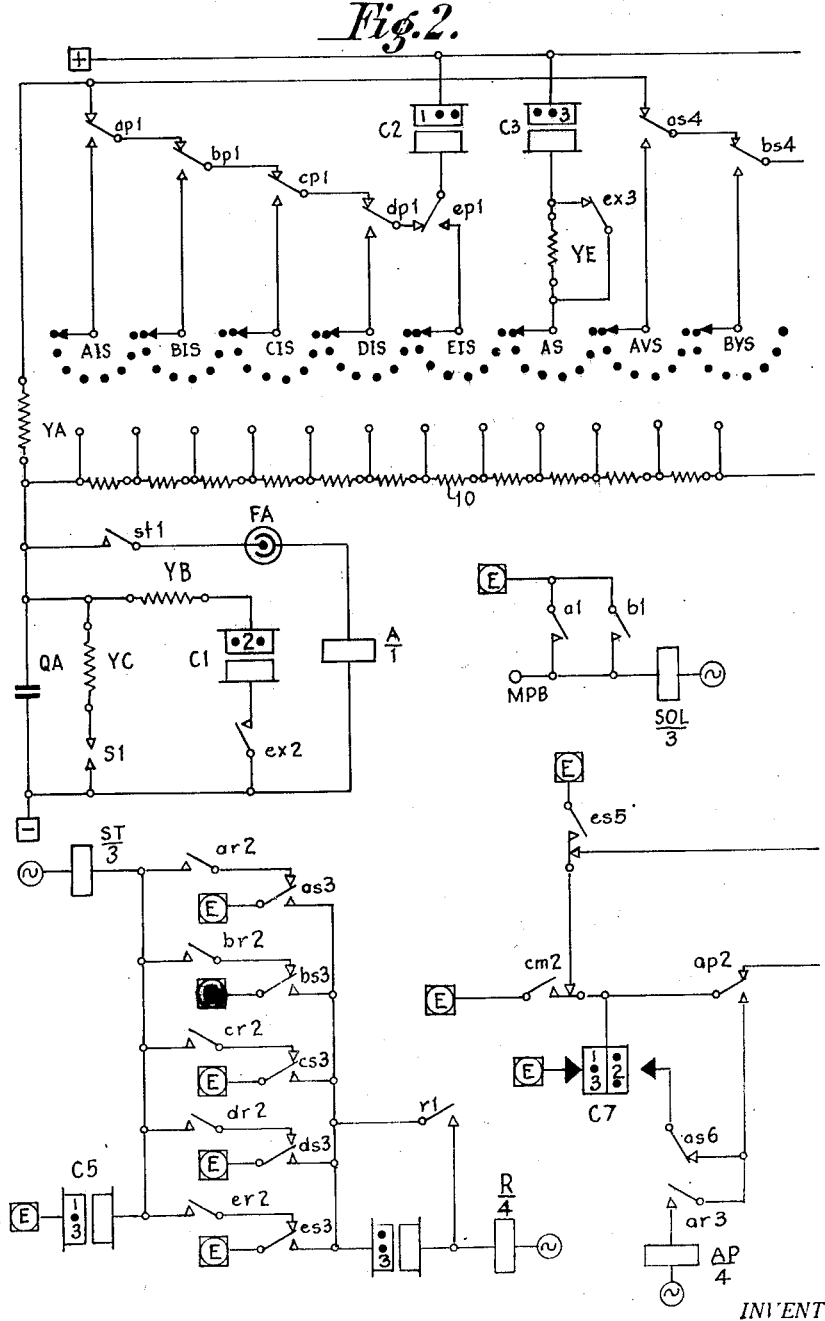
Figure 3:
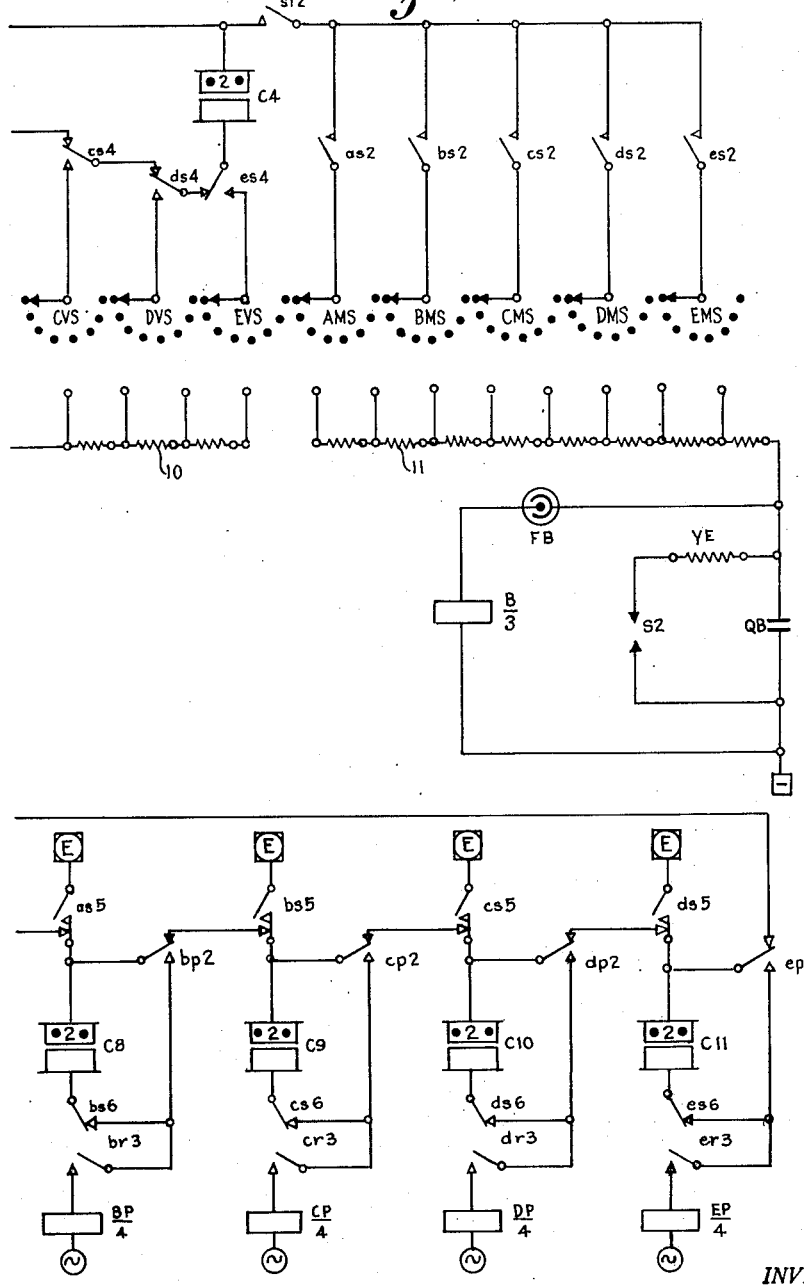

The invention will be better understood from the following description of a preferred method of carrying it into effect which should be taken in conjunction with the accompanying drawings. By these drawings, Fig. 1 shows diagrammatically sufficient of the electrical circuits to enable the invention to be understood and the general plan of the control arrangements may for instance be similar to that disclosed in British patent specification Nos. 541,658 and 512,439; and Figs. 2 through 5, inclusive, when arranged side-by-side, show the circuit connections of a five-phase controller embodying the principles of the invention, with it being noted that Figs. 2, 3 and 5 are substantial duplicates of Figs. 1, 2 and 4 of British patent specification No. 512,439, and Fig. 4 incorporates with the showing of Fig. 3 of the said British patent that showing which is made in Fig. 1 hereof.

The contacts ARC and AFC are assumed to belong to a detector associated with phase A and these contacts may be pneumatically operated from a tread member provided with two longitudinal cavities of the type shown in British patent specification No. 512,836. AR is the so-called road relay, AP and AS, shown in Figs. 2 and 4 respectively are the primary and secondary phasing relays for this phase, while EX is the so-called extension relay which may be common to all the phases and can be suitably associated therewith by appropriate cross-connections at the frame CCF.

As may be seen from reference to British patent specification No. 541,658 previously mentioned, relay AP is operated when the cam shaft next reaches the vehicle extension position after a demand has been put in by the operation of the road relay AR and remains operated until the same position is reached after the phase in question receives right of way. Relay AS is operated while the phase is actually receiving the green signal and for the subsequent amber leaving signal. The capacitor QA which may have a value of 4 mf. is shunted by a resistor RA1 of comparatively high value, for instance 30,000 ohms, while the relay AR is adapted to be shunted by a resistor RA2 of comparatively low value, for instance 300 ohms.

Assuming that right of way is held by some other phase so that the equipment is in the position shown, capacitor QA will be discharged. If a vehicle now arrives on the A phase, the contacts AFC will be closed and there will be a rush of current through the upper winding of relay AR to charge the capacitor and this current surge will operate the relay. It thereupon locks up over its lower winding and by means of other contacts (not shown) puts in a call to transfer right of way to this phase when the requirements of the other phases have been sufficiently met. Shortly thereafter and while contacts AFC still remain closed, contacts ARC will be closed so that a shunt is placed round the upper winding of relay AR but without any effect since it is locked up over its lower winding. The charge on the capacitor QA will gradually leak away through the resistor RA1 after the contacts are opened. If the detector is again operated before right of way is received, no effect will be produced by the repeated energisation of the upper winding of relay AR since the relay is already operated. In due course right of way is transferred to phase A and relays AP and AS are operated thereby releasing relay AR. The detector contacts AFC and ARC are now transferred to relay EX which is connected up similarly to relay AR except that it has only one winding. Hence for each detector operation, relay EX is operated for a predetermined period due to the current surge through capacitor QX regardless of the time of closure of the contacts AFC and ARC. Relay EX in known manner serves to secure repeated extension of the right of way period up to a maximum value if the traffic is sufficiently heavy.

If a fault should develop so that contacts AFC and ARC remain permanently closed, relay AR will be re-operated as soon as relay AS is released when phase A loses right of way and consequently right of way will be returned thereto as soon as the other phases have been dealt with. When relay AS is again operated however, the contacts AFC and ARC control relay EX but in the circumstances are only able to produce a single operation of this relay when relay AS first operates, the capacitor QX then remaining charged to substantially the full operating voltage. Hence right of way is not extended up to the maximum as would otherwise happen but only a single extension period is provided by relay EX. Consequently though the phase with which the faulty detector is associated may still obtain right of way when there is no traffic to justify it, the period for which this right of way is obtained will be a minimum instead of a maximum. Conversely, even if the traffic on the phase in question should be heavy, right of way will still be obtained only for the minimum period and to this extent the system does not work according to plan. This cutting down of the maximum period under abnormal conditions is thought to be preferable however to the arrangement in which a maximum period is always obtained even though there may be no traffic at all on the particular traffic lane in question.

It will be appreciated that the unidirectional feature is obtained in that if contacts ARC are closed before contacts AFC the capacitor QA will already be charged when contacts AFC are closed and consequently there will be no current flow to operate relay AR.

The switch AA is a so-called arterial switch which when operated ensures that right of way returns to this phase even in the absence of traffic. It will be appreciated that the effect of a short-circuited detector is substantialy the same as that produced by the operation of the switch AA, that is to say right of way will always be brought back to this particular phase but no extension up to maximum is automatically produced.

A reference to Figs. 2 through 5 of the drawings may now be had for a description of the operation of the complete apparatus. The vehicle detecting arrangement depicted by Figs. 2 through 5 is designed to operate for five traffic phases which are depicted as A through E. The showing in British patent specification No. 512,439 also may be referred to for a fuller understanding of the depicted apparatus.

Referring now to the circuit of Figs. 2-5, this as shown caters for five traffic phases designated A to E. The camshaft which is operated by a solenoid SOL has three positions, position 1 corresponding to the so-called initial interval for the phase associated with the common equipment, that is to say, the phase which has right of way, hereafter abbreviated R. O. W., and positions 2 and 3 corresponding to the vehicle and amber intervals respectively. The three camshaft positions are common to all phases, the phases being connected to the common equipment in a cyclic order if demands for R. O. W. are made on every phase. Contrary to ordinary camshaft controller practice, any phase not requiring R. O. W. has no effect on the camshaft cycle thus eliminating quick-stepping and the consequent delay in transferring R. O. W. which might be appreciable in the case of a transfer between widely separated phases. Each phase of traffic has four relays associated with it, a demand relay such as AR operated from a roadway detector, a primary phase relay AP and a secondary phase relay AS with its relief relay ASR. Relays CM, R, ST and EX form part of the common equipment as do also relays A and B which are connected in series with the neon tubes FA and FB and serve to control the stepping of the camshaft. The positions in which the various cam contacts C1, C2, . . . are closed are indicated by the figures marked therein.

In connection with the electric supply to the equipment the timing circuits are, as is usual, operated from direct current supplied to the terminals marked plus and minus while the remainder of the equipment with the exception of the vehicle detecting relays is assumed to be operated from an alternating current mains supply, one conductor of which is connected to earth. The corresponding terminal is indicated by an E in a circle and a square while the other terminal of the mains is indicated by the conventional alternating current symbol.

Alternating current at a comparatively low voltage is assumed to be provided for use in the vehicle detector circuit, the terminals concerned being indicated by the usual earth symbol and the conventional alternating current symbol.

For the purpose of the circuit description it will be assumed that R. O. W. is with phase A and that the camshaft is standing in the vehicle interval position 2. If no traffic arrives on the other phases, R. O. W. will remain with phase A and it will be understood that relays AS and ASR, Fig. 4, which were previously operated in the initial interval position 1 of the camshaft, remain locked during this time and light the phase A green lamp GA, red being shown to all other phases. At armature $as4$, Fig. 2, a charging circuit is completed from positive by way of cam contacts C4 over the phase A vehicle interval adjusting switch AVS and common tapped resistance 10 for condenser QA of the so-called A timer circuit, but owing to the fact that there is no traffic on any of the other phases, no circuit can be completed for relay ST which would connect the neon tube FA and relay A across condenser QA and thereby constitute its discharge circuit when it becomes fully charged. Suppose now a vehicle arrives on phase C, the associated demand relay CR, Fig. 4, operates and locks up over its armature $cr1$ and completes operating circuits for relay CP by way of armatures $cr3$ and $cs6$, cam contacts C9 and armatures $bs5$, $bp2$ and $as5$ and for relay ST, Fig. 2, by way of armatures $cs3$ and $cr2$. The latter relay connects the tube FA and relay A across condenser QA (Fig. 2) at its armature $st1$ and at the same time at its armature $st2$, Fig. 3, completes the charging circuit for condenser QB of the so-called B or maximum timer by way of armature $as2$, the phase A maximum period adjusting switch AMS and common tapped resistance 11. If the traffic on phase A remains substantially continuous, the repeated operation of the vehicle extension relay EX, Fig. 4, over armature $asr5$ by the phase A vehicle detector ARC and AFC will, at armature $ex2$, Fig. 2, repeatedly shunt condenser QA by resistance YB and prevent it from fully charging. No further operation will therefore ensue until the maximum timer circuit comes into operation and operates relay B which at armature $b1$ energizes the solenoid SOL, Fig. 2, to step the camshaft to the amber position 3. Alternatively, if there had been a suitable gap in the phase A traffic, the A timer circuit would have come into operation and operated relay A to bring about advancement of the camshaft to position 3. It will be noted that the solenoid in operating completes discharge circuits for the condensers QA and QB by shunting them by way of the solenoid contacts S1 and S2 and resistances YC and YE respectively.

Figure 4:
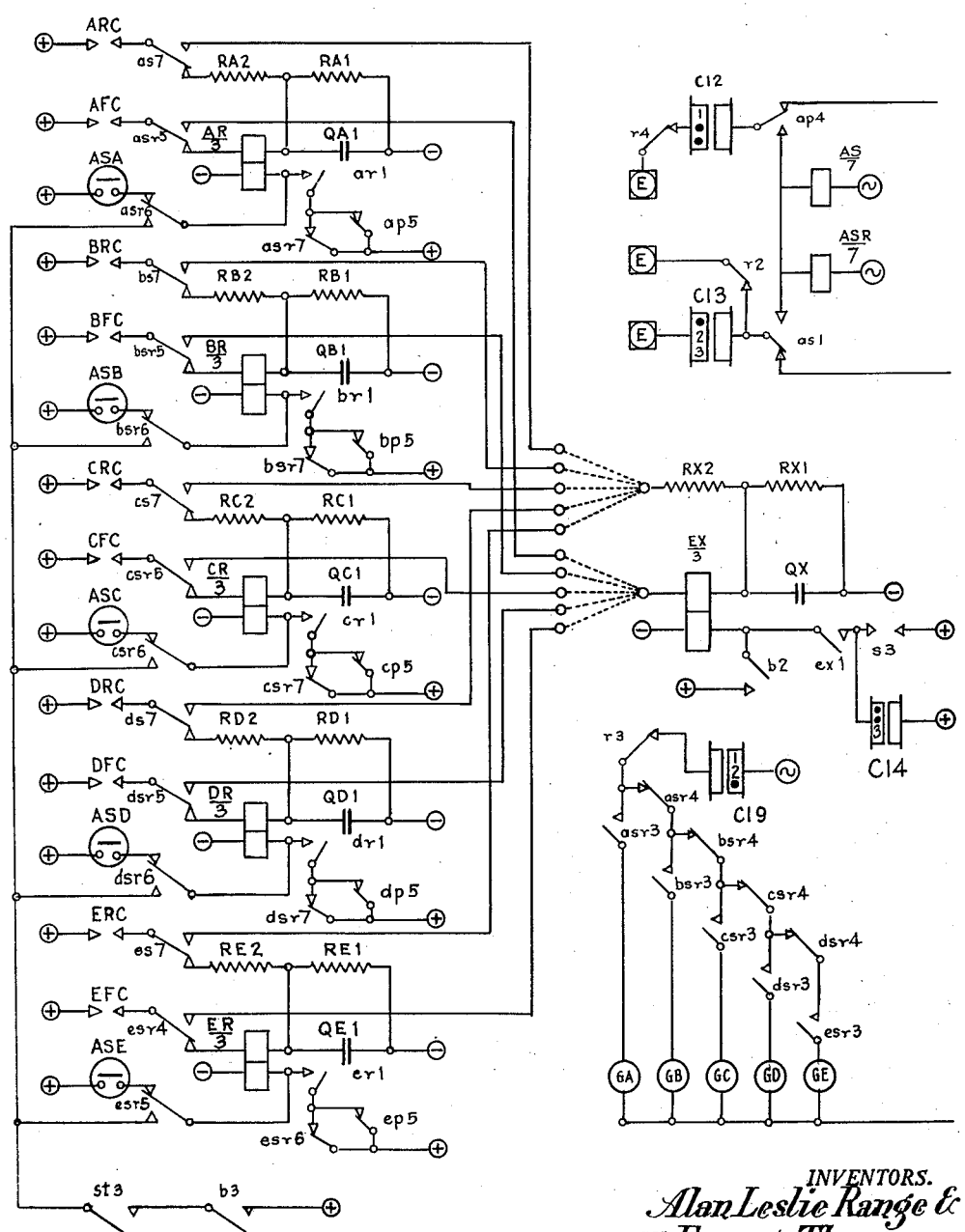

In position 3 cam contacts C19, Fig. 4, open and extinguish the phase A green lamp GA while cam contacts C20, Fig. 5, close to light the phase A amber lamp AA over armature $asr1$ and also the phase C amber lamp AC over armature $cp3$ in addition to the red lamp RC which remains lighted over armature $csr2$. The amber period is timed by the A timer over the common amber period adjusting switch AS, Fig. 2, and it will be noted that in this position of the camshaft, relay R, which has a function which will be more fully described later, is operated by relay AS over armature $as3$ and cam contacts C6. After the expiry of the amber period period, relay A again operates to advance the camshaft further to the initial interval postion 1.

Relays AS and ASR, Fig. 4, are now restored to normal owing to the opening of the cam contacts C13 and on restoration relay AS releases relay R which at armature $r4$, Fig. 4, reconnects the operating potential to the secondary phase relay chain circuit. This potential is disconnected by the operation of relay R in order to ensure that the relays of the phase receiving R. O. W. are not operated before the relays belonging to the phase losing R. O. W. are definitely released. On the release of relay R, a circuit is completed for the phase C secondary relays CS and CSR, Fig. 5, by way of the operated armature $cp4$ of the primary phase relay CP and resting armatures $bp4$ and $ap4$ and these relays are thereupon locked over armature $cs1$ and light the phase C green lamp GC at armature $csr3$ while red is shown to all other phases. The initial interval for phase C is now timed by the A timer over the phase C initial interval adjusting switch CIS after which the camshaft is stepped to the vehicle interval position 2.

In this position the holding circuit for the phase C demand relay CR, Fig. 4, is disconnected by the opening of cam contacts C16 and this relay now releases and will subsequently follow the operation of the phase C detector CRC and CFC. Relay CR on releasing releases relay CP, which since it has been locked over its own contacts, cannot subsequently be re-operated as long as R. O. W. remains with phase C, its operating circuit being disconnected by armature $cs6$ of the operated relay CS. Phase C now holds R. O. W. until such time as traffic arrives on any of the other phases, whereupon it is transferred to the next calling phase in the manner described, relays CS and CSR being maintained operated through the subsequent amber interval and then being released when the camshaft again reaches the initial interval position 1 in order to allow the next set of secondary phase relays to operate.

Calls received on any of the halted phases during the amber and initial interval periods result in the operation and locking up of their respective demand relays AR, BR, ..., but no further operation ensues until the camshaft reaches the vehicle interval position 2 where the primary phase relays AP, BP ..., corresponding to the calling phases may be operated.

If calls are received from two or more of the halted phases during the continuance of the vehicle interval period, it is arranged that demands for R. O. W. are dealt with in cyclic order. For example, if R. O. W. is with phase C and phase B calls, relay BP will be operated by way of armatures $cs5$, $dp2$, $ds5$, $ep2$, $es5$, $cm2$, $ap2$ and $as5$, cam contacts C8 and armatures $bs6$ and $br3$, and this relay will thereupon lock over its armature $bp2$. If, however, before the vehicle interval period terminates a call is received from phase A, which in this instance has preference over phase B, relay AP will be operated over the chain circuit and cam contacts C7 and at armature $ap2$ will release relay BP. Similarly, phase E has preference over phases A and B and phase D has preference over phases E, A and B under these conditions. Hence in the case under discussion, with R. O. W. on phase C if calls are received from all other phases, phase D will have preference and its primary phase relay DP will be operated, all other primary phase relays being released.

In case R. O. W. is forcibly removed from a phase due to the expiry of the maximum period, the demand relay is operated over contacts of the relevant secondary phase relay and armatures $b3$ and $st3$, relay B being operated under this condition by the maximum timer circuit. The demand relay locks up over the back contacts of its associated primary phase relay. The relay EX is also operated over armature $b2$ and serves to give an additional amber clearance period by inserting an extra resistance YF in the amber interval timing circuit at armature $ex3$, Fig. 1. When the camshaft steps to the next postion 3, the cam contacts C14 close so that a locking circuit is completed for the relay EX. In order to cover the transit time of the camshaft from position 2 to position 3 it will be noted that a holding circuit for relay EX is completed over the solenoid contacts S3 and armature $ex1$, contacts S3 remaining closed after relay B has released and until the solenoid SOL, which operates on the reverse drive principle, has stepped the camshaft to the next position. It will be seen that on every signal change some extension of the amber period is produced if a vehicle on the phase losing right of way operates a detector during the amber period as relay EX is then operated.

The terminal marked MPB in the solenoid circuit is connected by way of a suitable changeover switch to a manual push button by means of which the signals may be controlled by hand in emergency conditions. The operation of the switch which renders the manual push button effective serves also to open the vehicle interval and maximum timing circuits and to put in a permanent call on each phase. Right of way will therefore be given to all the phases in cyclic order and the amber and initial interval signals will be timed as usual, the manual control serving to terminate the vehicle interval.

The switches designated ASA, ASB, ...., in the vehicle detecting circuits are so-called arterial switches and when operated ensure that R. O. W. will return to the associated phase even in the absence of traffic thereon. Their effect is to simulate the operation of the detector pads at a time when the road in question is not receiving R. O. W., but owing to the fact that they have no contacts in the A timer circuit they do not produce any extension effect when the road has R. O. W.

Consideration will now be given to the conditions when the controller has been out of action and is switched into service by the connection of a current supply thereto. Assuming first that the camshaft is standing in position 1 relay CM, Fig. 5, which is only required for these conditions now operates immediately, locks up over armature $cm1$ and connects operating potential to the chain circuit for the primary phase relays AP—EP at armature $cm2$. Moreover since all the secondary phase relays are de-energized red is displayed to all approaches to the intersection. Relay ST however is operated over cam contacts C5 and since a charging circuit will be completed by way of cam contacts C2, armatures $ep1$, $dp1$, $cp1$, $bp1$ and $ap1$ and comparatively low resistance YA to charge condenser QA of the A timer circuit, relay A will almost immediately be operated to step the camshaft to the vehicle interval position 2.

No further operations take place until a call is received from say phase A whereupon relay AR operates and at armature $ar3$ completes a circuit for relay AP and at armature $ar2$ energizes relay ST. Since a further quick stepping circuit has already been completed by way of resistance YA, armatures $as4$, $bs4$, $ds4$ and $es4$ and contacts C4, relay A now again operates and the camshaft is advanced to position 3. Owing to the operation of relay AP, amber will now be displayed to phase A as well as red and the amber period will be timed in the usual manner after which the camshaft will be advanced to position 1. In position 1 of the camshaft, since relay AP is operated, relays AS and ASR are operated over contacts C12 to show green to phase A while relay CM is released by the operation of armature $as1$. The initial interval is now timed in the usual manner and the camshaft stepped to the vehicle interval position 2 whereupon relay AP is released and the controller continues to operate in the manner already described.

In case the camshaft has been stopped in position 3, on the switching on of the power the camshaft would have been advanced to position 1 after a period timed by the usual amber timing circuit but without any display of amber. Relay CM would then have been operated and the camshaft quickstepped to position 2. On the subsequent arrival of a vehicle, the camshaft would have stepped to position 3 and normal operation would have been resumed as described above.

In case the camshaft has been stopped in position 2, no change would have been produced when the power was switched on except the lighting of the red lamps. When a call was received however the camshaft would step to position 3 and subsequent operations would be as just described.

As previously mentioned, the fact that relay AR is operated by a surge of charging current ensures that in normal practice when the contacts AFC and ARC are opened, the current flow is negligible so that no difficulties occur with sparking. A further point is that use may safely be mode of relays designed for less than the full operating voltage and this results in fast operating characteristics.

The invention accordingly provides an important additional feature of safety in that certain forms of fault which cannot be entirely excluded are arranged to have very little adverse effect on the general efficiency of the system.

We claim:

1. In a traffic control system, a unidirectional detector comprising first and second contacts arranged to be closed successively due to the passage of a vehicle and in an order dependent on the direction of travel of said vehicle, further contacts, means for operating said further contacts, a source of current, a relay, a capacitor, circuit connections whereby on the closure of said first contacts when said further contacts are closed said capacitor is connected in series with said source of current, said first contacts, said further contacts and said relay, a resistor, and circuit connections whereby on the closure of said second contacts said relay is shunted by said resistor whereby said relay is momentarily operated by the charging current of said capacitor if said first contacts are operated ahead of said second contacts but not if said second contacts are operated ahead of said first contacts, the periods of operation being substantially independent of the length of time during which both said first contacts and said further contacts remain closed.

2. In a traffiic control circuit of the type claimed in claim 1, a high resistance element connected in shunt with the capacitor to limit its charged period in the absence of detector operation.

3. In a traffic control system for giving right of way to a plurality of traffic lanes in turn in dependence upon the operation of vehicle detectors located in the respective traffic lanes, first and second detector contacts arranged to be closed successively due to the passage of a vehicle in a traffic lane and in an order dependent on the direction of travel of said vehicle, a source of current, a first relay, a capacitor, circuit connections whereby on the closure of said first detector contacts said capacitor is connected in series with said source of current, said first contacts and said first relay, a resistor, circuit connections whereby on the closure of said second detector contacts said resistor is connected to shunt said first relay whereby said first relay will be operated only if said first detector contacts are operated ahead of said second detector contacts but not if said second detector contacts are operated ahead of said first detector contacts, contacts operated by said first relay for initiating the transfer of right-of-way to said traffic lane, a second relay, means for operating said second relay when right-of-way is given to said traffic lane, a third relay, a second capacitor, contacts controlled by said second relay whereby said first and second detector contacts are disconnected from the circuit of said first relay, and associated with the circuit of said third relay, circuit connections whereby on the operation of said first detector contacts when said second relay is operated said third relay is connected in series with said source of current, said first detector contacts and said second capacitor, a second resistor, circuit connections whereby on the operation of said second detector contacts said third relay is shunted by said second resistor whereby said third relay is momentarily operated by the charging current of said second capacitor if said first detector contacts are operated ahead of said second detector contacts but not if said second detector contacts are operated ahead of said first detector contacts, the period of operation being substantially independent of the length of time both said first detector contacts and the contacts of said second relay remain closed.

4. The traffic control system claimed in claim 3 comprising, in addition, a relay locking circuit including a second relay winding for maintaining the relay in operated state.

5. The traffic control system as defined in claim 3 comprising, in addition, a distributing frame for the relay for effecting extension to provide for ready variances of phases.

ALAN LESLIE RANGE.
ERNEST THORPE.

REFERENCES CITED

The following references are of record in the file of this patent:

UNITED STATES PATENTS

| Number | Name | Date |
|---|---|---|
| 1,976,369 | Platte | Oct. 9, 1934 |
| 2,442,427 | Mullerheim | June 1, 1948 |